United States Patent [19]

Silver

[11] 4,328,821
[45] May 11, 1982

[54] METHOD AND APPARATUS FOR THE CHEMICAL TREATMENT OF PLANTS

[76] Inventor: Robert H. Silver, 5913 Hillview Park, Van Nuys, Calif. 91401

[21] Appl. No.: 153,721

[22] Filed: May 27, 1980

Related U.S. Application Data

[63] Continuation-in-part of Ser. No. 965,949, Dec. 4, 1978, abandoned.

[51] Int. Cl.³ ............................................. F16K 19/00
[52] U.S. Cl. .................................. 137/7; 137/101.11; 137/599.1
[58] Field of Search .................... 137/7, 101.11, 205.5, 137/268, 564.5, 599.1; 239/317; 422/282

[56] References Cited

U.S. PATENT DOCUMENTS

| | | | |
|---|---|---|---|
| 885,396 | 4/1908 | Packard | 137/268 X |
| 1,712,804 | 5/1929 | Wytcherley | 137/268 UX |
| 1,917,704 | 7/1933 | Dresher | 137/101.11 |
| 2,738,323 | 3/1956 | Tepas | 137/268 UX |
| 3,038,490 | 6/1962 | Yocum | 137/318 |
| 3,312,235 | 4/1967 | Graceman | 137/268 |
| 3,351,290 | 11/1967 | Baldwin | 239/317 X |
| 3,968,932 | 7/1976 | Kimmell | 137/101.11 X |
| 3,974,847 | 8/1976 | Hodges | 137/101.11 |
| 4,074,685 | 2/1978 | Dodd | 137/101.11 |

FOREIGN PATENT DOCUMENTS 1117088 11/1961 Fed. Rep. of Germany ... 137/564.5

*Primary Examiner*—Robert G. Nilson
*Attorney, Agent, or Firm*—Freilich, Hornbaker, Wasserman, Rosen & Fernandez

[57] ABSTRACT

A method and apparatus for the chemical treatment of plants using a mixing tank connected to the inlet side of a pre-existing irrigation system having a shutoff valve and antisiphon valve. The tank is connected through an antisiphon valve and a throttling valve at the top of the tank to the high pressure side of the pre-existing shutoff valve and antisiphon valve using a saddle connector valve and flexible tube. The bottom of the tank is connected to the low pressure side of the pre-existing shutoff valve and antisiphon valve using a second saddle connector valve and flexible tube. Chemical to be dispersed is placed in the tank. The connector valves are first both opened while the throttling valve remains closed. Next the shutoff valve is opened to commence irrigation. Low pressure water backflows to fill the tank through its bottom connection, and the low water pressure is read on a gauge connected to the tank. The throttling valve on the tank is then opened sufficiently to increase tank pressure a calibrated amount. After sufficient time has lapsed for the calibrated chemical flow rate, the connector valves are closed, and the flexible tubes may be disconnected to drain and store the tank or move the tank to another irrigation system.

5 Claims, 1 Drawing Figure

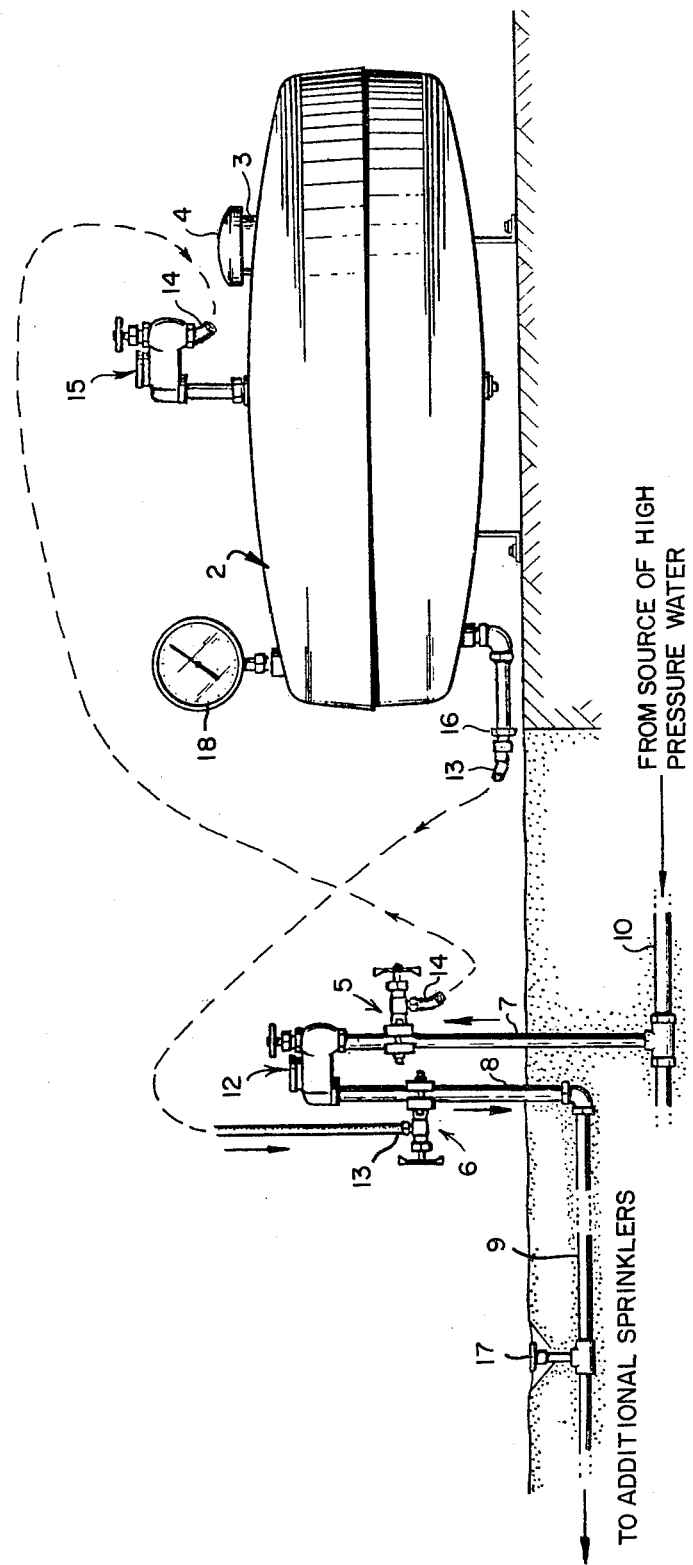

METHOD AND APPARATUS FOR THE CHEMICAL TREATMENT OF PLANTS

CROSS REFERENCE TO RELATED APPLICATION

This application is a continuation in part of application Ser. No. 965,949, filed Dec. 4, 1978 now abandoned.

BACKGROUND OF THE INVENTION

This invention relates to a method and apparatus for the chemical treatment of plants, and more particularly to a method and apparatus for the dispersement of chemicals to plants through an existing irrigation system connected to a high pressure water supply line by a shutoff value and an antisiphon valve.

Public water systems require that an antisiphon valve be used to connect lawn sprinkling systems, and the like, to the water supply line in order to assure that no contamination of the public water system occurs due to back flow. The required antisiphon valve is commonly built into the shutoff valve. Consequently, any system for introducing chemicals may be connected only at the outlet of the shutoff valve and antisiphon valve unit.

The system for dispersing chemicals may be of the mixing-tank type disclosed in U.S. Pat. No. 3,351,290, but unless the plumbing is changed to introduce a throttling valve between two connections for the mixing tank, and thereby introduce the mixing tank at the outlet of a shutoff valve and antisiphon valve unit, the system cannot be used without violating standards of public water supply safety deemed necessary for the health of all users of the public water system. This precludes using the chemical treatment system in existing lawn or other sprinkling systems without modifying the plumbing.

Since most lawn irrigation systems in current use have an antisiphon valve connected very close to the shutoff valve, or built into the shutoff valve as a single unit, many lawn sprinkling installations cannot be easily modified to accommodate a chemical dispensing system due to clearance from structures, sidewalks, or other plumbing. It would be desirable to connect the chemical dispersing system to the irrigation system at the existing outlet pipe of the antisiphon valve and the existing inlet pipe of the shutoff valve. An object of this invention is to provide a method and apparatus for accomplishing that without violating standards of public water supply safety. Another object is to provide for flow rate control of the chemical being dispersed with a single valve adjustment and with only a pressure gauge.

SUMMARY OF THE INVENTION

In accordance with the present invention, a chemical mixing tank is connected to upstanding pipes connecting a shutoff valve and antisiphon valve to a water supply line in a pre-existing plant irrigation system using saddle connector valves, i.e., valves which clamp onto the upstanding pipes. The connector valves, normally closed, are opened only while the mixing tank, connected by two flexible tubes, is in use. The tube at the outlet of the pre-existing shutoff and antisiphon valves is connected to the mixing tank directly, preferably at the bottom of the tank, and the tube at the inlet of the pre-existing shutoff and antisiphon valves is connected to the mixing tank through a throttling valve and an antisiphon valve, preferably at the top of the tank. The chemical to be mixed, preferably in liquid form, is first placed in the tank while the connector valves are closed. Next the connector valves are opened while the main shutoff valve is open and the throttling valve remains closed to fill the tank with back flow water. A pressure gauge on the tank is read to determine the low pressure of the irrigation system. Then the throttling valve is opened enough to increase the tank pressure a calibrated amount. The rate at which the chemical in the tank is dispersed to the plants is controlled by the rate of water flow into the tank. The pressure calibration is with respect to an orifice of predetermined size at the outlet of the tank. After use, the connector valves are closed and the flexible tubes may be disconnected to drain the tank prior to storing or moving it to another plant irrigation system to which saddle connector valves have been similarly applied. The concentration of chemical thus applied to the plants decreases with time. Therefore, after several minutes, the chemical concentration is so low that when the operation is complete, additional soaking of the plants is not required.

BRIEF DESCRIPTION OF THE DRAWINGS

The sole FIGURE illustrates a preferred embodiment of the invention which will best be understood from the following description when read in connection with the accompanying drawings. The novel features that are considered characteristic of the invention are set forth with particularity in the appended claims.

DESCRIPTION OF PREFERRED EMBODIMENTS

Referring now to the drawing, a pressurizable reservoir 2 is provided as a mixing tank having a filling port 3 with a sealing cap 4. In practice, the tank is filled with only that quantity of chemical to be used in treating plants. The chemical is preferably in liquid form, although any chemicals may be used if first dissolved, such as by placing the dry chemicals in the tank with a sufficient amount of water to put the chemicals into solution before using the tank.

Saddle connector valves 5 and 6 are clamped onto upstanding pipes 7 and 8 which connect an irrigation system pipe 9 to a main water supply line 10 through a combined shutoff valve and antisiphoning valve unit 12. Once the connector valves are clamped onto the pipes 7 and 8, they are allowed to remain permanently. When the mixing tank is not in use, the connector valves are closed and flexible tubes 13 and 14 to the tank may be disconnected from the connector valves in order to drain and store the tank or move the tank to some other irrigation system for chemical treatment of plants. The handles of the saddle valves may be made to be easily removed to prevent unauthorized opening of the saddle valves, such as by children. Alternatively, the saddle valves may be of the type which automatically close when the tubes are disconnected, and are forced open by the tube connectors.

The most common use of this system is for fertilizing lawns. A professional gardener who services lawns at many locations during the course of two to four weeks can thus provide fertilizing, or other treatment, of the lawns with just one tank. A new customer can be "hooked up" on the first visit using two saddle connector valves. Since each customer may have more than one lawn sprinkling system, additional connector valves will be required or each system, but once installed, the connector valves will permit the tank to be easily moved from one sprinkling system to another. Each sprinkling system will have its own shutoff valve and antisiphon valve to prevent back flow of chemicals to the high pressure line 10 through the tube 13. A throttle valve and antisiphon valve unit 15 will prevent back flow of chemicals through the tube 14.

The tube 13 is connected directly to the mixing tank, preferably at the bottom, while the tube 14 is connected to the mixing tank through the throttle valve and antisiphon valve unit 15, preferably at the top as shown. The tube 13 may be connected to the tank through a fitting 16 having a calibrated orifice to facilitate control of the rate at which chemical is dispersed from the tank to sprinklers 17 using the throttle valve in unit 15 and a pressure gauge.

The method of using the apparatus will now be described. The chemical is first poured into the mixing tank 2 through the filler port 3 which is then closed by means of the sealing cap 4, but first the tube 13 is connected to the fitting 16, and the tube 14 is connected to the unit 15. A wide range of plant chemicals can be obtained in liquid form. Otherwise, the fertilizer, weed killer wetting agent, or other chemical is first dissolved in the tank as noted hereinbefore. Then both connector valves 5 and 6 are open while the throttle valve in unit 15 remains closed. Next the main shutoff valve in unit 12 is opened. The tank is thus filled to the low pressure of the sprinkling system. This low pressure is noted on the gauge 18. While a sprinkler is specifically disclosed, the invention can be employed with any type of plant watering system.

With the main shutoff valve in the unit 12 still open, the throttling valve in the unit 15 is opened to allow the pressure in the tank 2 to increase to a calibrated pressure for the flow rate desired. This pressure, noted on the pressure gauge 18, is referred to as the chemical dispersing pressure, and is lower than the pressure of the water from the line 10, but higher than the pressure of the sprinkler line 9. This pressure difference controls the flow rate through the orifice of the fitting 16. So, for a given orifice diameter, the pressure difference can be calibrated for flow rate. The time required to disperse different amounts of chemical at different flow rates may be predetermined and indicated on a label placed on the tank. The chemical dispersing rate is thus regulated by only one valve, the throttling valve in the unit 15 which is opened an amount sufficient to cause the pressure reading on the gauge 18 to exceed the pressure reading of the sprinkler line pressure by a calibrated amount.

Although a calibrated orifice and a pressure gauge facilitate setting the flow rate of chemical from the tank, both the calibrated orifice and pressure gauge may be omitted. They are not essential to the operation of the invention. In fact, for the great majority of applications, the rate of flow of chemical from the tank is not critical. In many instances, the approximate flow rate from the tank can be set by observing the initial flow of liquid through outlet tube 13, which is preferably transparent to determine when all chemical has been dispersed. But in virtually every instance, any reasonably slow flow rate would be sufficient since the total quantity of chemical initially placed in the tank is evenly dispersed through all sprinklers. It would then be necessary to simply observe when clear water is passing through the tube 13 to determine that all of the chemical has been dispersed and the job is done.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. Apparatus for applying chemicals in liquid form to plants utilizing an existing irrigation system of the type that includes a pre-existing system having only a shutoff valve and antisiphon valve in line with pipes connecting a main water supply line to an irrigation pipe, said apparatus comprising a tank having a filling port for receiving the chemical to be applied, an inlet for receiving water, and an outlet with a fixed calibrated orifice for discharging the chemical mixed with water, means for indicating the pressure of liquid in said tank, means for coupling the outlet of the tank to a pipe at the low pressure side of said pre-existing shutoff valve and antisiphon valve, a throttling valve at the inlet of said tank, and means for coupling a pipe at the high pressure side of said pre-existing shutoff valve and antisiphon valve to said thottling valve.

2. The apparatus of claim 1 wherein said coupling means are each comprised of saddle connectors clamped onto said pipes.

3. A method for dispersing chemicals in liquid form from a tank to plants using an existing irrigation system of the type that includes a pre-existing shutoff valve and an antisiphon valve, said tank having a pressure gauge, and having a throttling valve, said method comprising the steps of connecting said tank to the low and high pressure side of said pre-existing shutoff valve and antisiphon valve with an inlet on said tank connected to said low pressure side and an outlet on said tank connected to said high pressure side, filling the tank to a desired level with said chemical, back filling the tank with water from the low pressure side of said pre-existing shutoff valve and antisiphon valve, noting the low pressure on said gauge and opening the throttling valve to increase the tank pressure a predetermined amount so that the chemicals in the tank are forced into the existing irrigation system at the low pressure outlet side of said shutoff valve and antisiphon valve as water from the high pressure side of said shutoff valve and antisiphon valve flushes the tank through the throttling valve on the tank at the outlet thereof whereby the rate at which chemical is dispersed is set by adjusting only one valve.

4. The method of claim 3 further comprising the use of a calibrated orifice at the outlet of said tank for flow rate control determination from the pressure difference between high pressure after initially pressurizing said tank and low pressure after discharge is commenced.

5. The method of claim 3 or 4 using saddle connectors to connect said tank with flexible tubes to pipes of said existing irrigation system into said high and low pressure sides of said pre-existing shutoff valve and antisiphon valve.

* * * * *